United States Patent [19]

Kersken et al.

[11] Patent Number: 5,734,965
[45] Date of Patent: Mar. 31, 1998

[54] ON-BOARD UNIT FOR TRANSPONDER OPERATION

[75] Inventors: Ulrich Kersken; Wilhelm Grabow; Wolfgang Detlefsen, all of Hildesheim, Germany

[73] Assignee: Robert Bosch GmbH, Stuttgart, Germany

[21] Appl. No.: 718,330
[22] PCT Filed: Mar. 23, 1995
[86] PCT No.: PCT/DE95/00403
§ 371 Date: Sep. 25, 1996
§ 102(e) Date: Sep. 25, 1996
[87] PCT Pub. No.: WO95/26511
PCT Pub. Date: Oct. 5, 1995

[30] Foreign Application Priority Data

Mar. 29, 1994 [DE] Germany ............... 44 10 896.6

[51] Int. Cl.⁶ ..................................................... H04B 7/26
[52] U.S. Cl. ........................ 455/45; 455/517; 342/51

[58] Field of Search ................................ 455/517, 88, 45, 455/110, 205; 375/303, 308, 323, 329, 334; 342/42, 51; 340/905

[56] References Cited

U.S. PATENT DOCUMENTS 5,537,672  7/1996  Grabow et al. ................... 455/517

Primary Examiner—Nguyen Vo
Attorney, Agent, or Firm—Kenyon & Kenyon

[57] ABSTRACT

An on-board unit includes at least one receiving and transmitting antenna for a bidirectional transmission of data which works in accordance with the transponder method. To compensate for interference fading, a high-frequency amplifier is connected in an incoming circuit to the demodulator/modulator, through which the transmission range of the transmission distance is improved as well. The same amplifier and the demodulator/modulator can be used in downlink and uplink operation. In uplink operation, the demodulator/modulator can alternatively subject the carrier signal to amplitude shift keying or phase shift keying.

13 Claims, 5 Drawing Sheets

1

ON-BOARD UNIT FOR TRANSPONDER OPERATION

BACKGROUND INFORMATION

The invention relates to an on-board unit having at least one receiving and transmitting antenna for the bidirectional transmission of data in accordance with a predetermined transponder method. German Patent Application No. 42 13 881 discloses an on-board unit, which works in accordance with a transponder method in the microwave range, and this on-board unit is used in traffic control systems to exchange data with a fixed beacon. This German Patent Application also describes a downlink transmission of data from the beacon to the on-board unit by means of an amplitude modulation. In accordance with this transponder method described by the German Patent Application, an unmodulated carrier signal is transmitted in an uplink transmission from the beacon, modulated by the on-board unit, and retransmitted to the beacon. When signals are transmitted between the beacon and the vehicle, the waves propagate to their destination not only over a direct path, but also by way of reflections, e.g., on the road surface, on the hood, or on other vehicles driving past. This multipath propagation gives rise to interference of the individual waves at the receiving location, so that depending on the phase relation of the individual waves, the result is either an increase or decrease in the total field strength. This effect, known as interference fading, can have a disruptive effect on the reliability of a transmission. This is especially true of an uplink operation, because the transmission distance has to be run through twice. Current systems solve this problem for example, by means of space diversity or antenna diversity, where at least two antenna elements are used on the on-board unit, in that the antenna element which receives the largest signal level is selected for the modulation in the uplink operation. However, this method is not reliable enough for all operating states, so that interference can nevertheless occur in the transmission.

SUMMARY OF THE INVENTION

In contrast, the advantage of the on-board unit according to the present invention is that the receiving signal that is influenced by interference fading or fading is initially amplified by a high-frequency amplifier before it is demodulated. Therefore, one is able to compensate for heavy fluctuations in the level of the receiving signal, making the data transmission more reliable. Another advantage is that amplifying the receiving signal increases the transmission range of the transmission distance, so that even at high vehicle speeds, there is still ample time to transmit all the data.

Furthermore, it is especially advantageous that the amplifier for the uplink signal is also adjustable in downlink operation in accordance with a predetermined algorithm, which is adaptable to the path of the signals. In accordance with the present invention, the high frequency amplification is performed in accordance with a squaring formula Vul= Vdl×Vdl, wherein Vul is an uplink amplification factor and Vdl is a downlink amplification factor.

The amplified high-frequency signal is supplied to a downstream demodulator/modulator circuit, which demodulates the received downlink signal in a downlink operation and modulates the received carrier signal in an uplink operation.

It is advantageous in this case that, in part, the same components are used both in a downlink operation for the demodulation, as well as in an uplink operation for the modulation.

When an amplifier is used, one single antenna element is sufficient to receive the downlink signal or the unmodulated carrier signal in an uplink operation, so that this also renders possible a simply designed on-board unit. The simplified design favors a small type of construction, so that the on-board unit can be mounted, e.g., in the area of the windshield or rear window of the vehicle. The on-board unit of the present invention can be used in the range of reception of a beacon to transmit traffic control data, vehicle guidance data, or for toll collection.

DETAILED DESCRIPTION OF THE INVENTION

Figure 1:
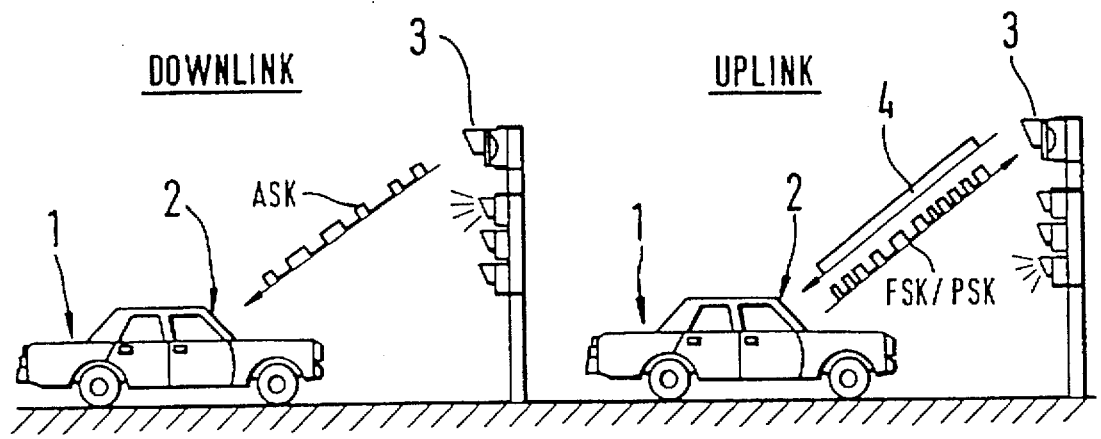
FIG. 1 illustrates a downlink and an uplink communication between an on-board unit and a beacon.

FIG. 1 shows a vehicle 1, which is situated on a street within the transmitting or receiving range of a beacon 3. The beacon 3 is designed as a stationary transmitting/receiving device, which is preferably mounted on a traffic light support or a gantry. In the left part of FIG. 1, the basic data transmission is shown in downlink operation between beacon 3 and an on-board unit 2. The on-board unit 2 is preferably mounted on the windshield or the rear window of the vehicle and aligned with its antenna to beacon 3. A frequency range of 5.8 GHz, the standard frequency range recommended by CEPT (Conference of European Postal and Telecommunications Administrations), is preferably used for the data transmission. Of course, the transmission can also be carried out at any other frequency. In a downlink operation, the data transmission preferably takes place with amplitude shift keying (ASK). In the right part of FIG. 1, the data transmission is schematically depicted in the uplink operation from vehicle 1 to beacon 3. Here, the transponder method is used, beacon 3 emitting an unmodulated carrier signal (continuous wave carrier) 4, which is received by on-board unit 2. This unmodulated carrier signal is modulated by on-board unit 2 with the data to be transmitted and is retransmitted to beacon 3. This preferably takes place by means of frequency (FSK) or phase shift keying (PSK) of a subcarrier, which, in turn, modulates the carrier. The beacon 3 demodulates the signal and decodes the corresponding data.

Figure 2:
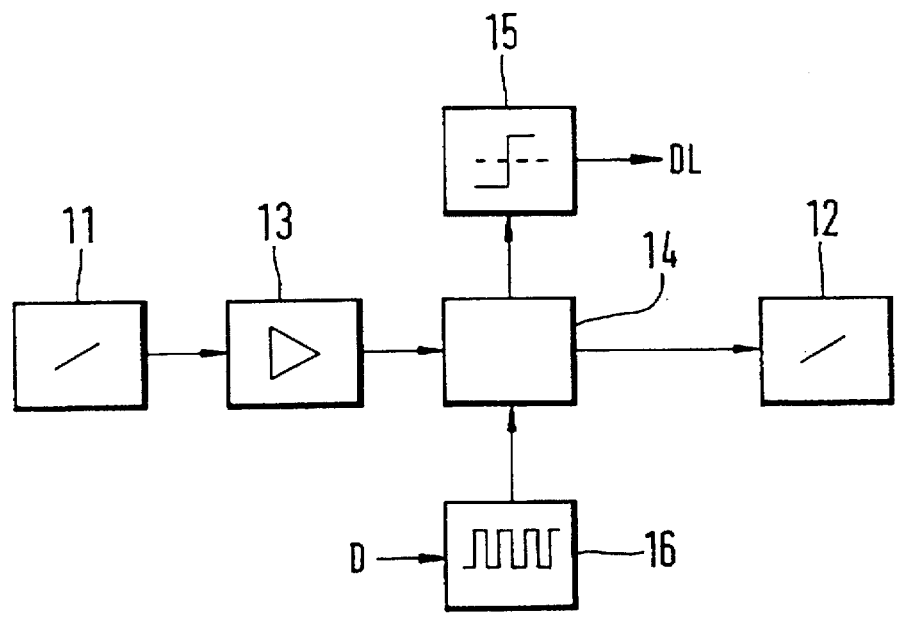
FIG. 2 illustrates the present invention according to a first embodiment.

FIG. 2 illustrates a first block diagram of a first exemplary embodiment. To keep the circuit expenditure required for the on-board unit as low as possible, only one amplifier 13 is used both in uplink as well as in downlink operation. Therefore, the block diagram of FIG. 2 shows an antenna element 11, which is linked to the input of amplifier 13. The output of amplifier 13 is linked to a demodulator/modulator 14, which is designed, e.g., with diodes. This circuit element 14 demodulates the receiving signal in downlink operation, while it modulates the received carrier signal in uplink operation. In downlink operation, the demodulated signal is fed to a discriminator 15, so that the downlink data DL are available for further evaluation. Provided for the uplink operation is a signal generator 16, which generates a frequency- or phase-modulated subcarrier, depending on the desired type of modulation. The output of generator 16 leads to a corresponding input of modulator 14 and, thus, controls the uplink operation. The uplink information to be transmitted is then contained as an FSK or PSK signal in the upper and lower sideband of the carrier signal. Modulator 14 is linked to a second antenna element 12, via which the modulated signal is retransmitted in uplink operation to beacon 3.

Figure 3:
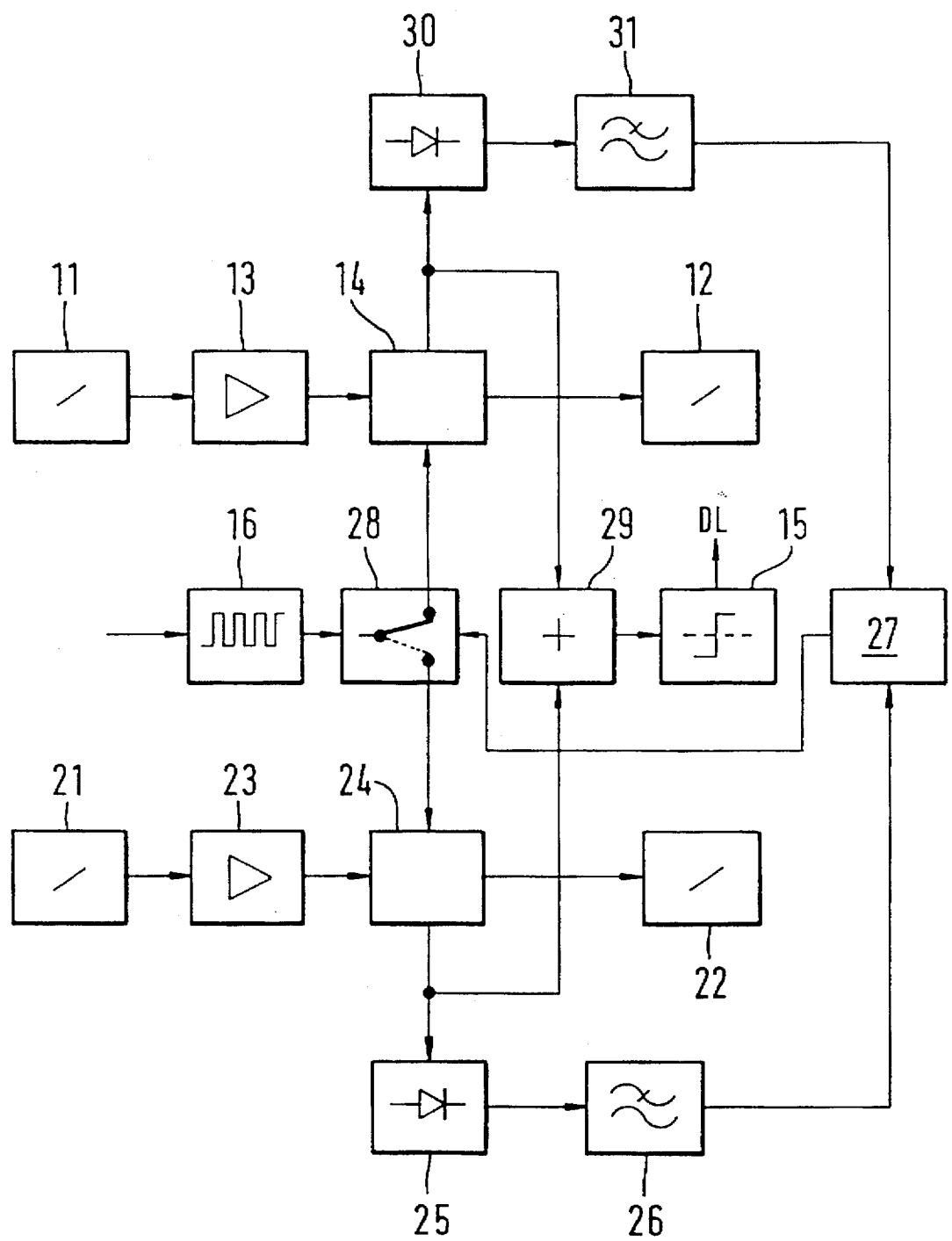
FIG. 3a illustrates the present invention according to a second embodiment.
FIG. 3b illustrates the present invention according to a variant of the second embodiment.
Figure 3A:
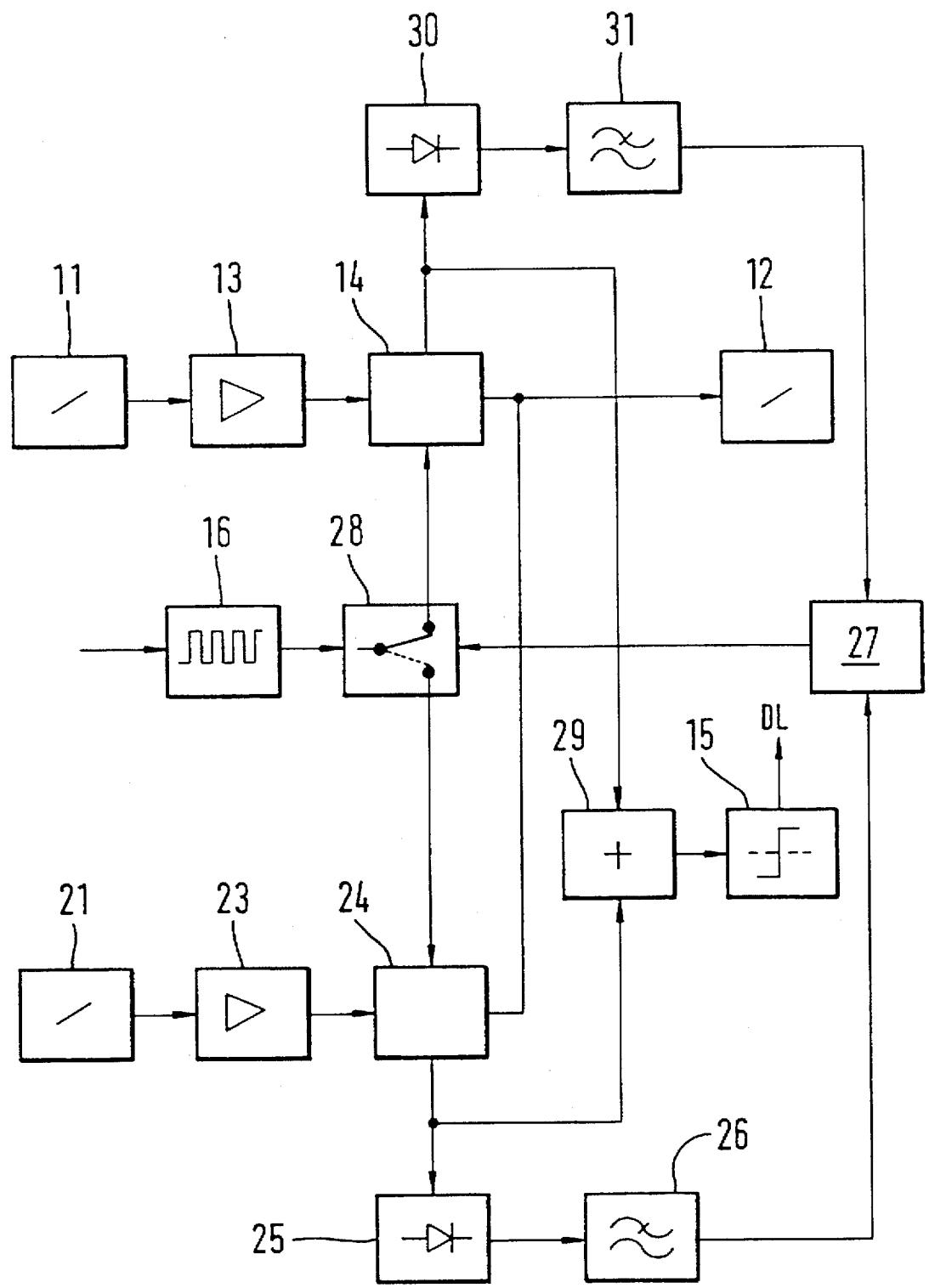

A second exemplary embodiment of the invention is shown in FIG. 3a. In order to improve transmission properties given a multipath propagation, the per se known diversity method is used, the on-board unit being equipped in accordance with the invention with additional high-frequency signal amplifiers 13, 23. The two amplifiers 13, 23 advantageously have the same kind of design, and are also designed in an integrated type of construction as a monolithically integrated circuit for amplifying microwaves.

Following the first exemplary embodiment of FIG. 2, in FIG. 3a, the first antenna element 11 is linked to a first amplifier 13. The first amplifier 13 is connected to a first demodulator/modulator 14. To determine the received signal level, the output of demodulator 14 is linked to the input of a first rectifier 30. The output of the first rectifier 30 is linked via a first low-pass filter 31 to an input of a comparator 27. In modulation operation, the uplink data are supplied to an FSK or PSK generator 16. The signal generator 16 is connected to a switch 28, which, in dependence upon the selection of the comparator 27, connects generator 16 to the control input of the first demodulator/modulator 14.

The first demodulator/modulator 14 is connected by an output having a third antenna element 12, by way of which the uplink data are transmitted in uplink operation to beacon 3. In the same way, the second part of this circuit is designed as follows. A second antenna element 21 is linked to a second amplifier 23. The output of the second amplifier 23 is linked to an input of a second demodulator/modulator 24. Generator 16 is connected in uplink operation via switch 28 under certain conditions to demodulator/modulator 24. The second demodulator/modulator 24 is connected by an output to a fourth antenna element 22, via which the uplink data are transmitted in uplink operation to beacon 3. The second demodulator/modulator 24 is connected via a second rectifier 25 and a downstream second low-pass filter 26 to a second input of comparator 27. In dependence upon the input level of its two inputs, comparator 27 controls switch 28 in open loop, switch 28 preferably being designed as a semiconductor switch. Downlink and uplink operations are alternately performed, the period of time for the uplink operation often being shorter than that for the downlink operation. Comparator 27 evaluates the signal level during the downlink operation and stores its adjustment for the uplink operation that follows. In this manner, the data are always transmitted in the uplink operation via the branch that had carried the higher input level in the preceding downlink operation. Comparator 27 thereby evaluates the output levels of the two demodulator signals at the output of the demodulator/modulators 14 or 24 so as to switch changeover switch 28 to the circuit having the largest receiving level. The demodulator/modulator is so connected in circuit with the lower receiving level, which is not linked in the subsequent uplink operation to signal generator 16, that no wave is radiated from this receiving branch via the antenna element connected thereto.

In the downlink operation, the downlink data are evaluated as follows. The signals received from the first and second antenna elements 11 and 21 are demodulated by the two demodulators 14 and 24, respectively, and added in a summing element 29. They are then fed to a discriminator 15, at whose output the downlink data are available. For the sake of clarity, base band amplifiers have not been drawn in here. However, they can be provided, if necessary.

Except for demodulator/modulator circuits 14 and 24, the construction of the individual modules are known per se and, therefore, do not need to be elucidated.

Figure 4:
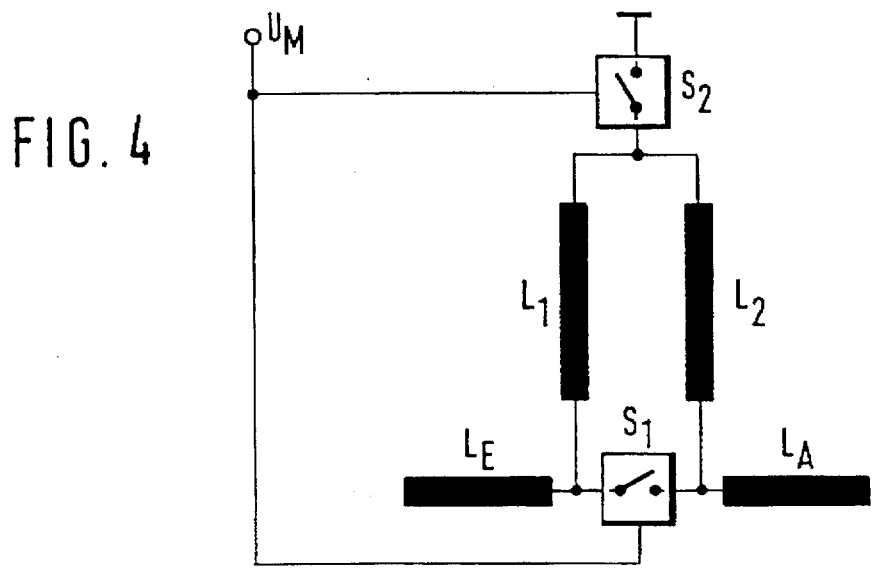
FIG. 4 illustrates a first configuration of a demodulator/modulator circuit.

The mode of operation of these two exemplary embodiments will be elucidated in the following on the basis of FIGS. 4 and 5. The demodulator-modulator circuit 14 or 24 constitutes an important subassembly of on-board unit 2. First, the modulation circuit will be considered here. Since the primary aim is to have inexpensive on-board units, preference is given to simple design approaches in terms of circuit engineering. Therefore, the preferred modulation methods in uplink operation are amplitude shift keying (0/1) or phase shift keying (1/−1 or 0° and 180° phase). In phase shift keying, the total signal energy from the received carrier signal is radiated again. On the other hand, in amplitude shift keying, only half of the energy (−3 dB) is radiated again. From this, one can discern that phase shift keying is more effective. FIG. 4 illustrates a simple exemplary embodiment of a phase or amplitude shift keying. The modulation voltage $U_M$ thereby controls two switches $S_1$ and $S_2$. Switch $S_1$ has a feeder line and a discharge line $L_E$ and $L_A$, which are each connected to one side of the switching contact of switch $S_1$. Also connected to this switching contact are lines $L_1$ and $L_2$ by their one end. Their two second ends are joined together and connected to one contact of switch $S_2$. The second contact of switch $S_2$ is connected to ground. Typically, lines $L_1$ and $L_2$ have an electrical length of $\lambda/4$ ($\lambda$=wavelength at the carrier frequency) and, thus, each represents a phase shift of 90° for the inherent frequency. It is likewise possible to use lines $L_1$ and $L_2$ of an electrical length of an odd-numbered multiple of $\lambda/4$ (e.g., ¾ $\lambda$, 5/4 $\lambda$). If both switches $S_1$ and $S_2$ are closed, then the signal is conducted directly from the input to the output. There is a short-circuit point at the end of the $\lambda/4$-long lines $L_1$ and $L_2$. Since the input impedance $Z_E$ of a $\lambda/4$-long line that is short-circuited at the end represents open-circuit operation ($Z_E$ goes toward infinity), the two lines $L_1$ and $L_2$ do not influence the signal.

If, on the other hand, both switches $S_1$ and $S_2$ are open, then lines $L_1$ and $L_2$ are in the signal path, so that compared to the previously mentioned case, a phase shift of 180° results.

The circuit is also suited for amplitude shift keying. In this case, the signal must be blanked by adjusting the two switches $S_1$ and $S_2$ in opposition. If $S_2$ is closed and $S_1$ open, then the signal arrives neither directly nor indirectly via lines $L_1$ and $L_2$ at the output. If switch $S_2$ is open and switch $S_1$ is closed, then the signal is divided in equal portions between the direct path via switch $S_1$ and the indirect path via lines $L_1$ and $L_2$. At the signal output, both equal sized signal portions are superposed, one over another, with a phase shift of 180° and are thus extinguished.

Figure 5:
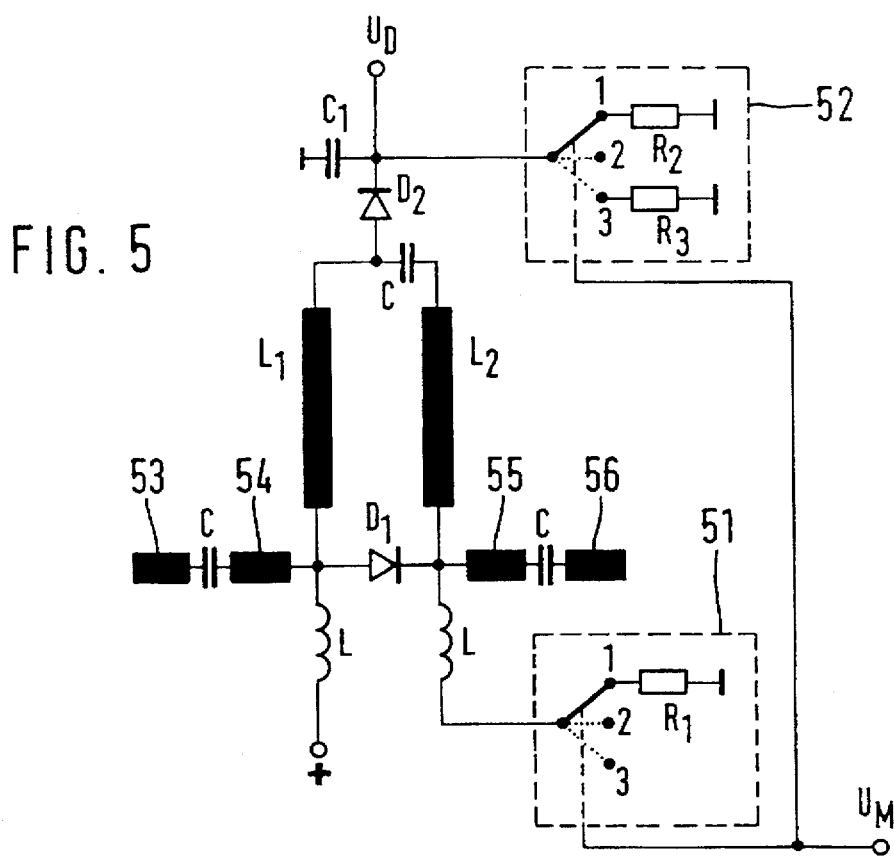
FIG. 5 illustrates a second configuration of a demodulator/modulator circuit.

FIG. 5 shows a second exemplary embodiment of a demodulator/modulator, which works according to the aforementioned principle. Here, discharge lines $L_E$ and $L_A$ are replaced by conduction devices 53, 54 and 55, 56, a capacitor C being connected between conduction devices 53 and 54 and between conducting devices 55 and 56. Instead of switch $S_1$, a diode $D_1$ is connected. Diode $D_1$ is connected on the anode side to a direct voltage to inject an inductance L. On the cathode side, another inductance L is connected, whose second end is connected via a changeover switch to positions 1, 2, 3. In position 1, the changeover switch is connected via a resistor $R_1$ to ground; in switch positions 2 and 3, the switch is open. This first changeover switch 51 is controlled in a similar manner through modulation voltage $U_M$, as already described with reference to FIG. 4. The two second ends of lines $L_1$ and $L_2$ are likewise interconnected via a capacitor C, on one side of capacitor C, a diode $D_2$ being connected on the anode side. On the cathode side, the diode is connected with a capacitor $C_1$ to ground. On the other side, it is connected to a second changeover switch 52, which likewise exhibits switch positions 1, 2, 3. Switching contact 1 is connected via a resistor $R_2$ to ground; switching contact 2 is open, and switching contact 3 is connected via a resistor $R_3$ to ground. Furthermore, the demodulation voltage $U_D$ can be drawn at the cathode of diode $D_2$.

In the practical design of the circuit, capacitors C and $C_1$ are selected so as to nearly represent a short-circuit for the carrier frequency. On the other hand, the two inductors L used for injecting d.c. current constitute an open-circuit operation for the carrier frequency. In uplink operation, when working with phase shift keying, the two changeover switches 51, 52 are switched over in the same direction between stages 1 and 2. In stage 1, diodes $D_1$ and $D_2$ are switched through, in stage 2, they block. Resistors $R_1$ and $R_2$ are selected so as to allow ample currents to flow in order to switch through diodes $D_1$ and $D_2$. When working with amplitude shift keying, the changeover switch 51, e.g., is permanently set to stage 1, and the changeover switch 52 is switched over between stage 1 and 2. The switches are controlled by the FSK or PSK generator, as had been described previously in FIGS. 2 and 3.

When diode $D_2$ is properly selected, the circuit can also be used to demodulate the ASK-modulated downlink signal. For this purpose, diode $D_2$ is operated in a suitable range of its non-linear characteristic to obtain, e.g., the greatest possible responsivity. It is often necessary to allow a small current to flow through diode $D_2$. This current is adjusted in a demodulation operation in switch stage 3 by way of resistor $R_3$. Diode $D_2$ then works as a detector. The impedance of the diode is also able to be changed, if indicated, by means of the diode current. The demodulated data current is applied in parallel to capacitor $C_1$. Changeover switch 51 is likewise at switch stage 3 so that diode $D_1$ blocks.

Since the diodes generally do not have any ideal switching properties, in some instances, the circuit must be supplemented by applying adaptation and compensation measures. Another possible embodiment of the invention provides for other circuit variants, with resistors in the positive voltage line, with diodes that are turned around, or other taps of the modulated signal. FIG. 3b illustrates a variation of the block diagram of FIG. 3. In contrast to the circuit in FIG. 3, instead of two transmitting antenna elements 12, 22, only one transmitting antenna 12 is needed in the circuit of FIG. 3a. The outputs of demodulators/modulators 14, 24 are joined together and linked to transmitting antenna 12. This junction is so designed that the demodulator/modulator, which is not modulating at the moment, is switched so as not to influence the signal path of the modulating branch from the modulator to the antenna element.

Figure 6:
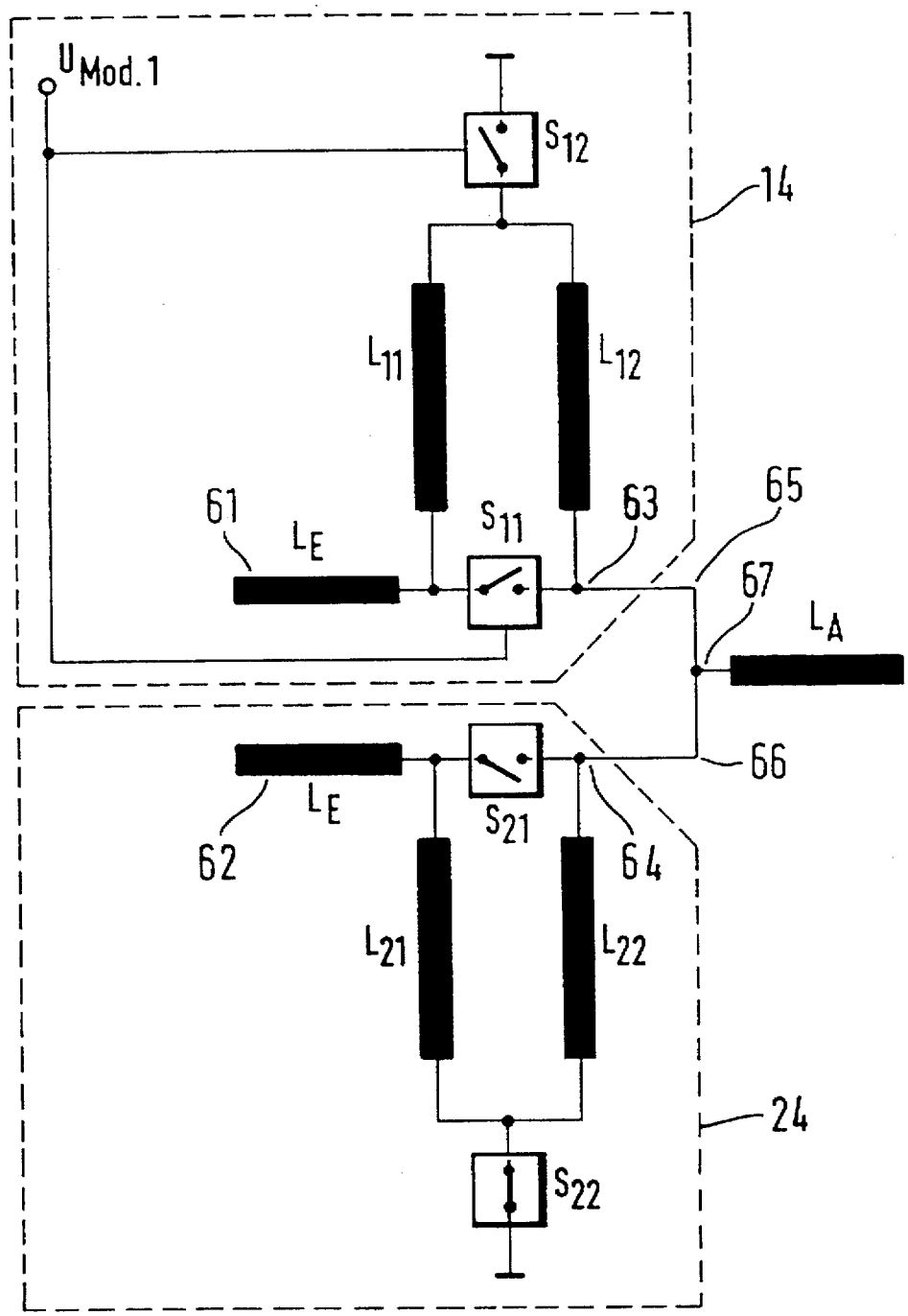
FIG. 6 illustrates a third configuration of a demodulator/modulator circuit.

FIG. 6 depicts an exemplary embodiment for joining the two transmitting branches. In each case the basic circuit depicted in FIG. 4 is used for demodulators/modulators 14, 24. The circuit has a symmetrical design. FIG. 6 shows an example where demodulator/modulator 14 modulates and demodulator/modulator 24 is switched so that it neither modulates nor influences the signal path. For the sake of clarity, circuit elements not needed for this circuit state have been omitted.

What is typical of this arrangement is that the output contacts of switches S11 (63) and S21 (64) are interconnected. They are joined together either directly, in which case lines 65 and 66 have the length zero, or via electrical $m*\lambda/2$ long lines ($\lambda$=wavelength at the inherent frequency, m$\in$N). A discharge line LA is connected to the junction point 67. In addition, it also applies for this circuit example that lines L11, L12, L21 and L22 have an electrical length with an odd-numbered multiple of $\lambda/4$ (($2n-1)*\lambda/4$, n$\in$N).

The switches of the modulator/demodulator, which is switched off for the duration of the uplink, are permanently adjusted. The switches of the modulator/demodulator which modulate for the duration of the uplink are switched in conformance with the data contents and the modulation. For the example depicted in FIG. 6, S21 is open and S22 is closed; S11 and S12 are switched. S21 is open and, thus, in the ideal case represents an open-circuit operation (high impedance) at output 64. Situated at the end of line L22 is the closed switch S22, which in the ideal case represents a short-circuit point and, transformed at the beginning of the line over the $\lambda/4$ long line L22, likewise represents an open-circuit operation. Since the switch position of S21 and S22 represents a high input impedance at output 64, the signal path between demodulator/modulator 14 and the signal output is not influenced by the demodulator/modulator circuit 24.

Because of the symmetrical design, these considerations also apply when the situation is reversed.

What is claimed is:

1. An on-board unit for performing a bidirectional transmission of data with a beacon in accordance with a predetermined transponder method, the on-board unit comprising:
   at least one receiving antenna for receiving data transmitted from the beacon, the data transmitted from the beacon comprising a downlink signal that is modulated in accordance with an amplitude shift keying technique;
   at least one transmitting antenna for transmitting data to the beacon, the data transmitted to the beacon comprising an uplink signal that includes a carrier signal, the carrier signal being initially received from the beacon and being frequency or phase modulated by the on-board unit via a subcarrier before retransmission to the beacon;
   at least one amplifier for performing a high-frequency amplification on at least one of the downlink signal and the uplink signal in accordance with a predetermined algorithm comprising a squaring formula $V_{UL=VDL} \times V_{DL}$, wherein $V_{UL}$ is an uplink amplification factor and $V_{DL}$ is a downlink amplification factor.

2. The on-board unit of claim 1, further comprising a demodulator/modulator circuit coupled to the at least one amplifier, the demodulator/modulator circuit demodulating the downlink signal and modulating the carrier signal of the uplink signal.

3. The on-board unit of claim 2, wherein the demodulator/modulator circuit modulates the carrier signal of the uplink signal in accordance with frequency shift keying or phase shift keying.

4. The on-board unit of claim 2, further comprising a comparator, wherein the at least one receiving antenna includes:

a first receiving antenna for producing the downlink signal with a first receiving level;

a second receiving antenna for producing the downlink signal with a second receiving level, wherein the demodulator/modulator circuit comprises:

a first demodulation/modulation unit coupled between the first receiving antenna and the comparator;

a second demodulation/modulation unit coupled between the second receiving antenna and the comparator, wherein the comparator determines the higher of the first receiving level or the second receiving level and selects for uplink operation the first demodulation/modulation unit if the first modulation/modulation unit demodulates the downlink signal with the higher receiving level or selects for uplink operation the second demodulation/modulation unit if the second demodulation/modulation unit demodulates the downlink signal with the higher receiving level.

5. The on-board unit of claim 2, wherein the demodulator/modulator circuit includes:

a first switch connected to a modulation voltage, the first switch having at least a first contact and a second contact;

a second switch connected to the modulation voltage, the second switch having at least a third contact and a fourth contact, the fourth contact being coupled to ground;

a first conduction device coupled between the first contact of the first switch and the third contact of the second switch;

a second conduction device coupled between the second contact of the first switch and the third contact of the second switch, wherein the modulation voltage controls the first switch and the second switch, the second switch short circuiting the first conduction device and the second conduction device to ground, and the first switch short circuiting the first conduction device and the second conduction device.

6. The on-board unit of claim 5, wherein the first switch and the second switch each comprises a diode, the operating point of each of the diodes being adjustable by a control signal.

7. The on-board unit of claim 6, wherein the control signal is produced from a plurality of resistors.

8. The on-board unit of claim 6, wherein each of the diodes is capable of demodulating the downlink signal.

9. The on-board unit of claim 1, wherein the at least one receiving antenna and the at least one transmitting antenna comprise one transmitting/receiving antenna for receiving the downlink signal and transmitting the uplink signal.

10. The on-board unit of claim 1, wherein the data transmitted between the beacon and the on-board unit relate to a traffic control system.

11. The on-board unit of claim 10, wherein the traffic control system relates to vehicle guidance.

12. The on-board unit of claim 10, wherein the traffic control system relates to checking vehicles for authorized access.

13. The on-board unit of claim 10, wherein the traffic control system relates to toll collection.

* * * * *